United States Patent [19]

Leiber

[11] Patent Number: 4,589,511
[45] Date of Patent: May 20, 1986

[54] ALL-WHEEL DRIVE AUTOMOTIVE VEHICLE TRACTION CONTROL SYSTEM

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 620,467

[22] Filed: Jun. 14, 1984

[30] Foreign Application Priority Data

Jun. 14, 1983 [DE] Fed. Rep. of Germany ....... 3321377

[51] Int. Cl.⁴ .......................................... B60K 17/356
[52] U.S. Cl. ..................................... 180/197; 180/244
[58] Field of Search ................................ 180/197, 244

[56] References Cited

U.S. PATENT DOCUMENTS

| | | | |
|---|---|---|---|
| 3,819,004 | 6/1974 | Adde | 180/197 |
| 3,893,535 | 7/1975 | Borckhardt | 180/197 |
| 3,967,862 | 7/1976 | Hunter | 180/197 X |
| 4,164,872 | 8/1979 | Weigl | 180/197 X |
| 4,344,139 | 8/1982 | Miller | 180/197 X |
| 4,410,947 | 10/1983 | Strong | 180/197 X |
| 4,416,347 | 11/1983 | Bertling | 180/197 |
| 4,432,430 | 2/1984 | Lind | 180/197 |

Primary Examiner—Harold W. Weakley
Attorney, Agent, or Firm—Frishauf, Holtz, Goodman & Woodward

[57] ABSTRACT

To prevent spinning of wheels in all-wheel vehicles, a traction control system is used which, in its simplest form, may use existing wheel speed sensors. If any one, or more, or all of the wheel speed sensors provide output signals representative of spinning of a wheel, for example by providing output signals representative of a substantially higher speed than other wheels, or higher than a reference—indicating that all wheels are spinning—an output signal is generated by the electronic control unit (6) which, in turn, controls application of the wheel brake to the respective wheel, thus preventing its spinning. Spinning of any one wheel, of course, causes loss of traction at another one due to the effect of the normally interposed differentials (4, 5, 3a). Thus, the system provides a simple, electronically controlled "differential lock-up", responsive only to speed of spinning wheels, without modification of the differentials as such, by applying the external wheel brakes, selectively, to those wheel or wheels which are spinning.

5 Claims, 4 Drawing Figures

ALL-WHEEL DRIVE AUTOMOTIVE VEHICLE TRACTION CONTROL SYSTEM

The present invention relates to road vehicles with all-wheel drive, for example automotive vehicles having two axles in which all four wheels on the two axles are driven, or multiple-axle vehicles in which all the axles have drive wheels thereon. In such vehicles, it is customary to connect not only the wheels on any one axle by a differential, but also the respective drive axles among each other in their driven relationship to the engine or, respectively, a transmission between the engine and the drive shafts by differentials.

BACKGROUND

All-wheel drive vehicles are known, and have the advantage that, under difficult operating conditions, such as snow, ice, sand or the like, the traction available for the vehicle is substantially improved. In order to avoid starting difficulties of the vehicle if the wheels slip or are difficult to turn, it has been customary to provide lock-up elements for one or all of the differentials; the rear wheels, particularly, were often supplied with locking-type differentials in which the respective wheels are securely connected together so that spin of one wheel with respect to another is eliminated. Non-slip or low-slip differentials or lock-up differentials may be used in the position of any of the differentials in the drive system.

Lock-up differentials, or low-slip or non-slip differentials have a disadvantage; critical operating conditions may occur upon application of braking, so that the control of the vehicle can be impaired. This is particularly so if, in addition to the four-wheel drive and the no-slip or locking differentials, the vehicle has an automatic brake control system (ABS) in which the braking pressure, typically hydraulic pressure, applied to the respective wheels is controlled in accordance with slip of the wheels. Such ABSs are well known.

THE INVENTION

It is an object to improve the traction available to the wheels of an all-wheel drive vehicle, and more particularly of an all-wheel drive vehicle which is equipped with an automatic brake control or an anti-lock braking system.

Briefly, a traction control system is provided which includes wheel speed sensors applied to the respective wheels of the vehicle which generate output signals representative of individual wheel speed. The brakes associated with the wheels are then controlled in such a manner that, if the speed of any one wheel is sensed to differ markedly from the speeds of the other wheels, that particular wheel receives braking pressure, so that, in effect, the wheel is locked against spinning by its brake, thus permitting the differential, or other differentials, to apply full traction to the other wheels which are coupled to the differential.

The braking pressure may be applied to more than one wheel, and the reference speed may be derived from a reference speed generator already present in an ABS, or from the speed of one or more of the other wheels, or a composite thereof.

The system has the advantage that it is easily applied, and does not require any modification of standard differentials. Additionally, the undesirable secondary effects of no-slip or lock-up differentials with respect to overall vehicle performance are avoided.

Upon starting, the same effect is obtained as a complete differential lock-up. Thus, excellent traction is available for all the wheels which do not spin, or have a tendency to spin. All the wheels are controlled to receive the appropriate drive power, and the slip of any one of the wheels is appropriately controlled, thus providing for excellent lateral guidance and avoidance of application of yawing torques. Excellent traction is also available at the front wheels of a four-wheel drive vehicle. The use and installation of an anti-wheel block system is standard, well known, and does not introduce any mechanical difficulties in the construction of gearing, transmission and differentials, and is substantially less expensive than the provision of non-slip or low-slip differentials.

It is known to apply control of slippage of driven wheels. The present invention is not specifically related to this feature but, rather, to an electronic alternative for low-slip or non-slip or lock-up differentials in an all-wheel drive vehicle.

The control of the drive slip is carried out in well-known manner. Preferably, the signals of the various transducers on the wheels provide a reference value, corresponding approximately at least to vehicle speed, to provide a simulated speed reference value. The level of the speed reference is, preferably, derived from the transducers of the wheels at one side of the vehicle, and increase in speed is applied as the reference value with some time delay to the system or to the control of the other wheels.

The situation may occur that all wheels of a four-wheel drive vehicle will slip, and, under such conditions, the system would apply the brakes to all the four wheels. In order to prevent excessive forces and torques from arising, the engine is controlled to reduce torque if all wheels are slipping, for example by reducing fuel input, or other engine operating parameters, such as, for example, fuel injection timing (which may apply both to gasoline as well as Diesel engines) or ignition timing.

In accordance with a preferred feature of the invention, application of braking pressure to stop wheel slip is carried out only up to a predetermined speed limit, so that braking of a wheel, which has a speed substantially in excess of the reference speed, is inhibited at reference speed levels beyond a predetermined limit. Thus, the application of braking pressure to the slipping wheel can, thus, be modified or entirely disabled. It is also possible to modify engine parameters, in the direction to reduce torque of the engine, particularly upon slippage of all the wheels by merely controlling fuel supply.

DRAWINGS

DETAILED DESCRIPTION

Figure 1:
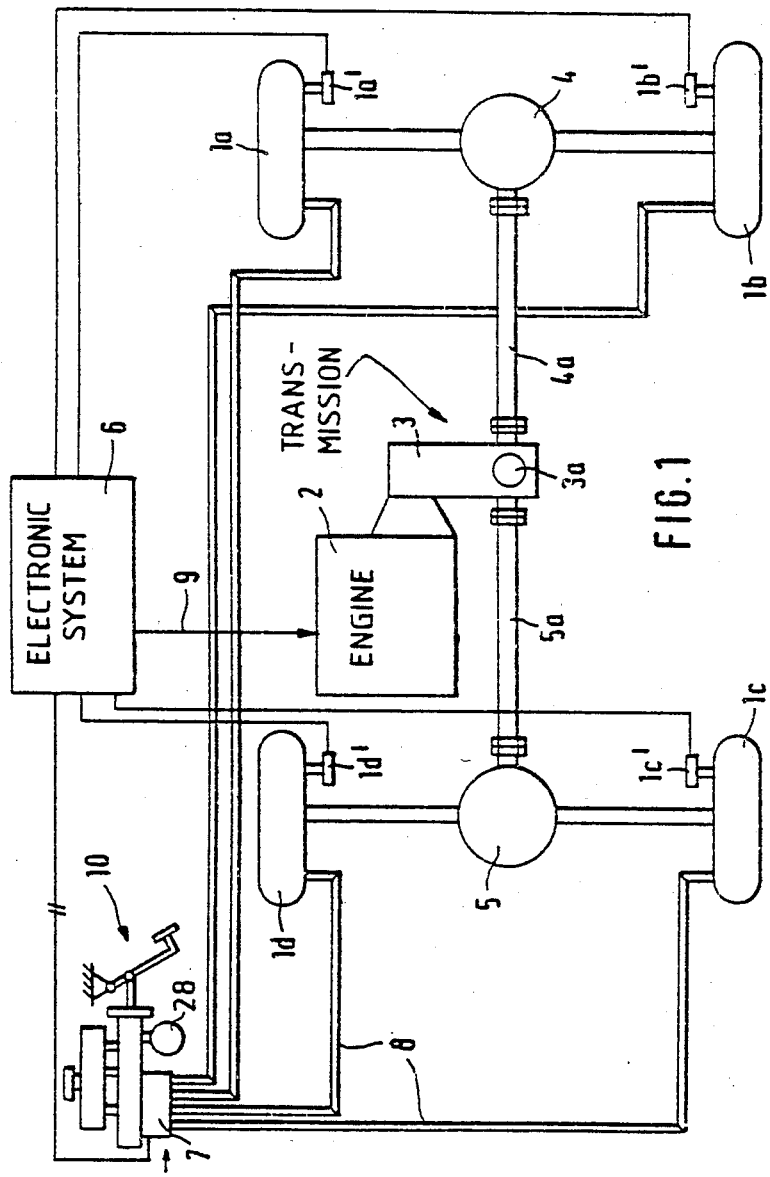
FIG. 1 is a schematic block diagram of an all-wheel vehicle traction control system.

The traction system for a four-wheel drive vehicle is schematically shown in FIG. 1. The vehicle has four wheels $1a$, $1b$, $1c$, $1d$, in which wheels $1a$, $1b$ may be the front wheels, and wheels $1c$, $1d$ the rear wheels. The wheels are connected to respective drive axles which are interconnected by respective differentials 4, 5. The engine 2, typically an internal combustion engine (ICE), is coupled to a transmission 3 via a usual clutch, which may be mechanical or hydraulic (not shown). The transmission 3 applies its output to a drive differential 3a which, in turn, is coupled to the drive shafts 4a, 5a which apply tractive effort to the differentials 4, 5, respectively, for then driving the wheels.

Figure 2:
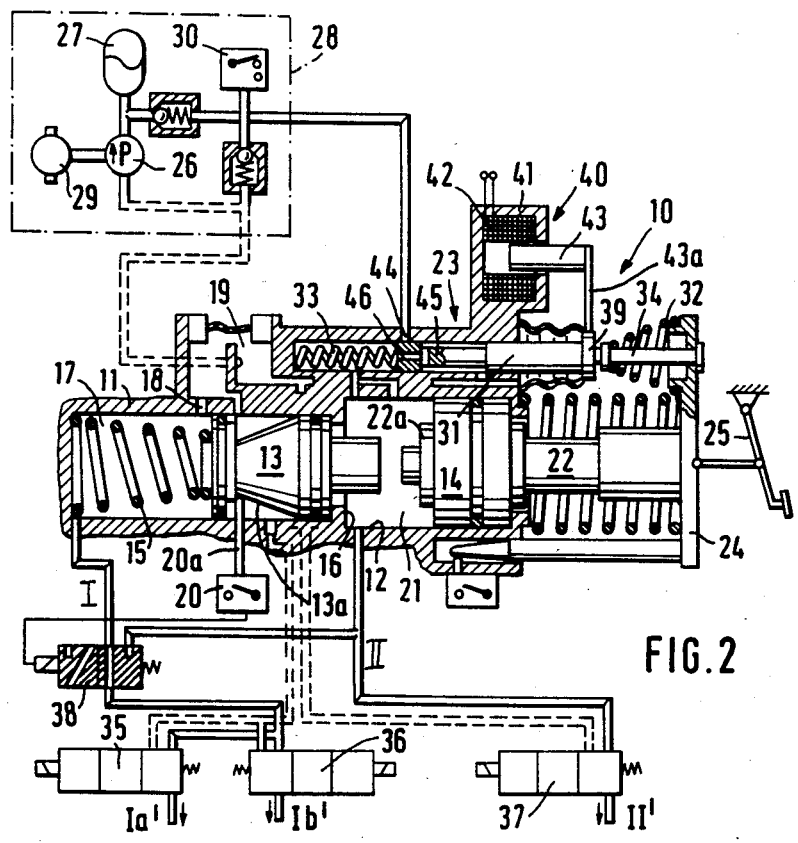
FIG. 2 is a schematic hydraulic arrangement controlling the braking system for wheels of the vehicle.

Wheel speed sensors $1a'-1d'$, as well known in the art, and of any suitable construction, are connected to the respective wheels $1a-1d$. The output wheel speed signals are applied to an electronic system ES shown as a unit or block 6. The electronic system recognizes if one or more of the wheels should slip, that is, have a speed substantially in excess of the wheel speed of another wheel, or a group of other wheels, and provides an output signal to a hydraulic brake control block 7. The hydraulic brake control block 7 can be the standard braking system of the vehicle, controlled by the unit 6. Pressurized brake fluid, derived from a pressure source 28, described in detail with reference to FIG. 2, is supplied via respective pressure lines 8 to the brakes of the wheels $1a-1d$. Thus, pressurized brake fluid or other braking control can be applied to the respective wheels to prevent slipping or spinning of any one, or more of the wheels. If the electronic system 6 should determine that all the wheels are spinning, that is, if the speeds of all the wheels are high with respect to a reference level, the system provides, by simple comparison of signal levels with a reference, as well known, by use of a comparator, applies a signal over a control line 9 to the engine 2 in a direction to control the engine 2 to decrease output engine torque, for example, by changing the position of a throttle, the characteristics of fuel injection, or the like.

The hydraulic system 7-10-28 is shown in greater detail in FIG. 2: The braking system 10 (FIGS. 1, 2) is constructe in form of the well-known twin-braking circuit. It has a hydraulic tandem main braking cylinder. The braking cylinder is formed within a housing 11, and includes a stepped cylinder 12 in which two pistons 13, 14 are located. The forward or front piston 13 is located by a resetting spring 15 against a shoulder 16 formed in the cylinder, and positioned within a working fluid chamber 17, to which a first braking circuit I is connected. The rest position of the piston 13 is shown in FIG. 2; in this position, the piston 13 is connected through a duct 18 formed in the housing with a refill chamber 19. The forward region of the main braking cylinder thus forms a closed braking circuit. Piston 13 has an inclined surface between two piston areas shown at 13a, forming a camming surface, against which a cam follower 20a operating a switch 20 is engaged.

The second piston 14, operated behind the front piston 13, is operable within a larger step of the cylinder 12 and defines a chamber 21 to which a second braking circuit II is connected. Piston 14 is constructed in ring form, and completed by the end surface 22a of a push rod 22 passing through the ring piston 14. The effective surface acting on the ring piston, thus, is formed by the facing end surface of the piston 14 and by the surface 22a of the push rod 22. The push rod 22, which is stepped, can be operated together with a control valve 23 by the brake control pedal 25 via a brake operating plate 24. The control valve 23 is so constructed that in its two possible terminal positions, chamber 21 is connected either with a relief chamber, namely the supply chamber 19, or with a pressure source 28. Pressure source 28 includes a pump 26 and a pressure reservoir 27. The pump 26 of pressure source 28 is driven by a motor 29, energized when a pressure responsive 30 senses that the pressure within the pressure reservoir 27 has dropped below a predetermined pressure level. The pressure supply unit 28 is well known.

The tandem braking circuit shown in FIG. 2 is merely an example of one type of braking circuit to which the present invention can be applied; different types of tandem or two-circuit main braking systems may be used, and the particular type of cylinder here shown is merely an illustration for better understanding of the construction of a positioning element which is operatively coupled to the control valve 23.

Control valve 23 has a control slider 31 which is operated from the brake pedal plate 24 via a coupling spring 32. The control slider 31 has comparatively long slider surfaces, so that, even if the braking pressure from pump 26 should fail, full excursion of the braking pedal can still supply brake fluid, by operating the brake to the final limit position, and thereby causing operation of the brake push rod or plunger 22 which, initially, will operate freely, but later on will carry along the ring piston 14 by a coupling, not specifically shown. Structures of this type are well known.

The control slider 31 is pressed by a biassing spring 33 towards the right—with reference to FIG. 2—in its starting position, in engagement with the plunger 34 on the pdeal plate 24 under control of the spring 32.

The braking system with which the present invention is particularly suitable is an anti-brake lock, automatic braking system ABS, and the control of brake fluid to the respective braking cylinders is effected by 3/3 magnetic valves 35, 36, 37 which, in dependence on the control signals applied from an automatic braking system, provide for increased braking pressure being applied to the brake cylinders of any one of the wheels, maintenance of braking pressure, or drainage of braking pressure, as well known.

The control slider 31 has one end terminal 39. At that terminal 39, a controllable operating element 40 is engaged. The controllable operating element 40 is illustrated, in FIG. 2, as a pull-in magnet or solenoid, formed as a solenoid coil 41. The solenoid coil 41 has a winding 42 and an armature 43. Upon energization of the winding with current of any desired and predetermined wave form, in which amplitude, frequency, or pulse repetition rate is controllable, armature 43 is pulled in to the magnet in similar manner, and, by coupling to the terminal 39, moves the control slider 31 along. A connecting link 43a coupled the armature 43 to the terminal 39 of the slider 31.

OPERATION

Control slider 31 can be operated by two different control energy sources:

(1) Control slider 31 can be pushed by the push rod 34 from pedal plate 24, operated by the operator of the vehicle upon engagement of the brake pedal 25.

(2) In addition, the control slider 31 may be operated by electrical energization of the positioning element 40, that is, by energizing the terminals of solenoid 41 with electrical signals.

In either case, the control slider 31 is pushed towards the left, thus controlling admission of pressurized brake fluid, that is, braking energy, via a pressure inlet 44 on the control valve 23 through a ring groove 45 and a central through-bore 46 on the slider 31 into the pressure chamber 31, and from there first into the braking circuit II. By suitable spring setting, the pressure will act on the piston 13 and generate pressure in the chamber 17 so that the braking pressure will also become effective in the braking circuit I. Thus, without operation of the braking pedal 25 at all, the brakes can be operated by the positioning element 40 and valves 35-37 can apply braking pressure to the respective brakes of the wheels to control slip of the wheels.

Figure 3:
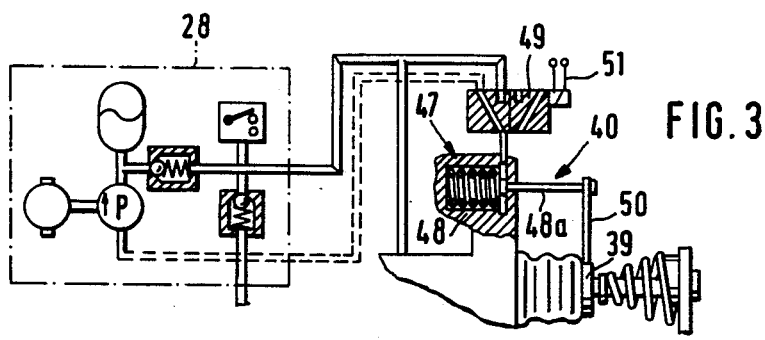
FIG. 3 is a fragmentary diagram of FIG. 2, and illustrating a modification.

Embodiment of FIG. 3: The system is identical to that of FIG. 2, except that the positioning element 40 has been replaced by a hydraulic working cylinder 47, which has a positioning piston 48, controlled by a magnetic valve 49 which, upon electrical energization of the magnetic valve, controls the piston via hydraulic pressure to shift its position. and The shifted position is applied over a piston rod 48a to the engagement point 39 of the control slider 31. A connecting plate 50 is the link between the piston rod 48 and the terminal point 39 of the control slider of the valve 23. The magnetic valve 49 is electrically energized similar to the solenoid 41 by electrical signals applied to terminals 51. The operation of the braking valves, thus, is effected indirectly by the hydraulic positioning unit 47 and magnetic valve 49.

The electrical signals being supplied to the valves 35-37 can be of any suitable and desired type, for example in clock pulses, pulses with different current levels, different pulse repetition rates, pulse-pulse gap duty cycles and the like, in order to obtain suitable time-current functions and control the actual braking effort at the respective wheels, so that the slip at the wheels will be appropriately controlled. The electronic system 6, which furnishes these signals to the valves 35-37, respectively, can be readily designed to provide suitable output signals depending on operating requirements of the vehicle as such.

The switch 20 is used to switch over, automatically, application of brake fluid between the valves 1a', 1b', associated with the braking circuit I to the braking circuit II in case of failure of the braking circuit I, for example by leakage. This system of automatic change-over is well known, and a similar arrangement can, likewise, be used for change-over of braking fluid from the braking circuit I to the braking circuit II. The broken-line hydraulic connections are as well known return lines for the pressure fluid. The broken line shown in FIG. 3 is an illustration of a drain, which can be connected as shown, or connected to another suitable drain line connection.

Figure 4:
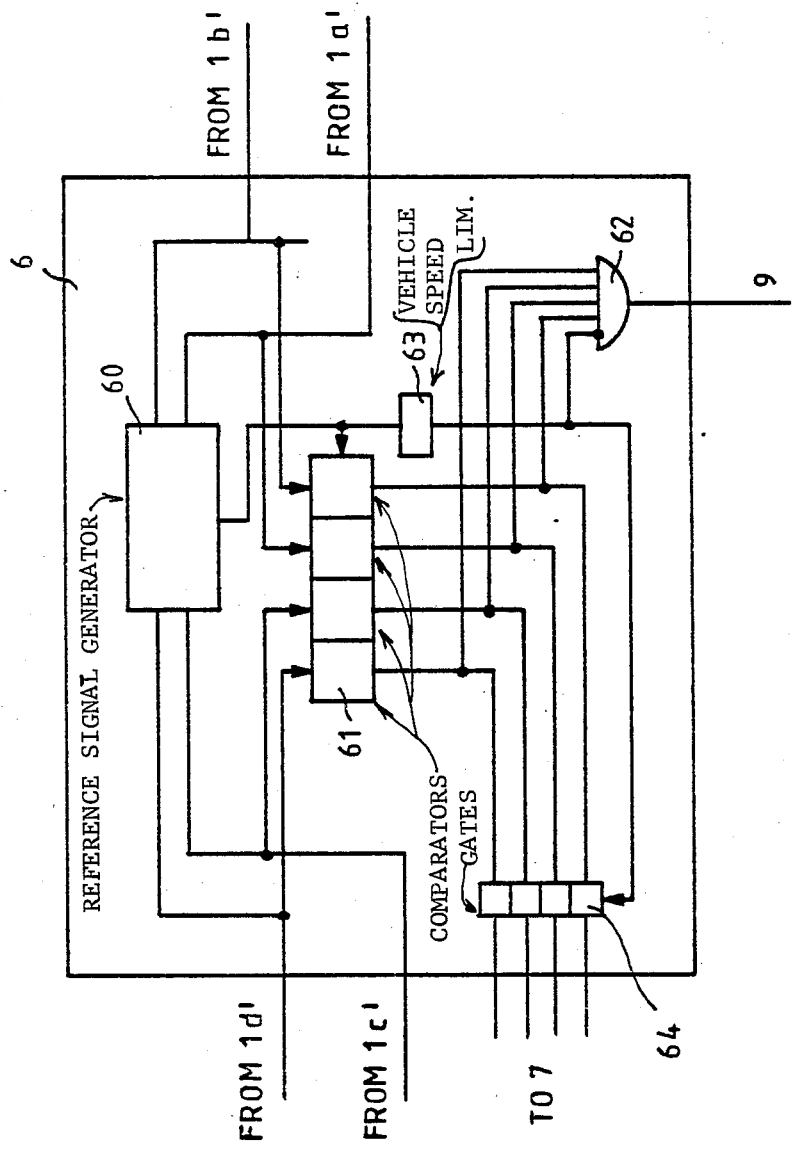
FIG. 4 is a detail of the block diagram of FIG. 1.

Various changes and modifications may be made, and features described herein may be used with any of the others within the scope of the inventive concept. The specific valve and the control arrangement shown in FIGS. 2 and 3 are merely illustrative. In FIG. 4 the unit 6 is shown in greater detail. The four lines coming from the sensors 1a'-1d' are connected to a unit 60 in which a reference-signal is generated from these speed-signal which equals the vehicle speed. This is done in known manner by increasing the reference-signal in dependence of the sensor-signals only delayed. This reference signal is fed to the comparators 61 in which the sensor-signals are compared with this reference signal and in which control-signals for the valves 7 or 35-37 are generated. The control-signals are also fed to an AND-Gate 62 which generates a control signal if all control signals are present. This signal is fed via line 9 to the engine 2 to decrease the torque of the engine. The control signals to the valves 7 and the engine 2 are cut off if the vehicle-speed is above a given level. This is done in unit 63 which generates a cut off signal when this level is reached. This signal inhibits the AND-gate 62 and gates 64 in the lines to the valves 7.

As illustrated in FIG. 1, the hydraulic unit 7 of the brake system 7 applies braking pressure to the wheels 1a . . . 1d individually. FIG. 2 is slightly different in that, for example, the wheels of a braking circuit, e.g. the front wheels, are individually controlled by valves 35, 36, through braking circuit I, at brake lines 1a', 1b', whereas the rear wheels are commonly controlled by a single valve 37, through a brake line II'. The respective brake valves 35, 36, 37 which operate at a slow speed, that is, which do not slip, can be disabled from the electronic system 6 by merely connecting the valve of the respective circuit, e.g. valves 35, 36, to the drain line of the anti-skid braking system, so that no braking effort will be applied by those respective valves, thus reducing loading on the engine 2. Only those wheels, or that wheel which spins will be subjected to braking so that the wheel which spins is braked permitting more tractive effort to be applied to the other wheels. The control of the respective valves 35, 36, 37 can readily be effected by suitable connecting lines from the unit 6, in dependence on relative sensed velocities.

If the speed differential between any one of the wheels and the other wheels as sensed in the unit 6 is such that the respective electrical coil 41, or magnet 49 at terminals 51 is energized, braking pressure is applied. The wheels which should not have braking pressure applied at that time are then connected to the drain line. The logical connection can readily be instrumented by a simple logic network, constructed in accordance with Boolean algebra, as well known and standard in logic control systems.

I claim:
1. The combination of an all-wheel drive automotive vehicle comprising
   an internal combustion engine (2);
   a transmission (3) coupled to the engine;
   four wheels, two each at a front axle, and two each at a rear axle;
   a front axle differential (4) and a front axle drive shaft (4a) coupled to the front axle differential to permit driving the front wheels from the engine via the transmission;
   a rear axle differential (5) and a rear axle drive shaft (5a) coupled to the rear axle differential to permit driving the rear wheels from the engine via the transmission; and
   a coupling differential (3a) coupled to the transmission (3) to be driven thereby and connected to the front axle drive shaft as well as to the rear axle drive shaft;
   with a traction control system comprising
   a brake control unit (35, 36, 37) associated with each wheel for, respectively, applying braking control pressure, or relieving braking control pressure from an associated wheel;
   including
   speed sensors (1a'-1d') coupled to the respective wheels and providing individual wheel speed output signals;
   a control unit (6) connected to receive all the individual wheel speed output signals from all of the speed sensors, the control unit combining at least two of said wheel speed output signals to develop a reference signal representative of vehicle speed, said reference signal being formed from at least two wheel speed signals, with time delay with respect to the then pertaining at least two actual wheel speed signals;

automatic brake control means (7) coupled to the brake control units (35, 36, 37) associated with brakes of the wheels, said brake control means (7) being connected to and controlled by said control unit (6) which receives the wheel speed signals to control the brake control unit of at least one wheel which provides a wheel speed output signal which differs substantially from said reference signal, indicative of speed of said at least one wheel which is high with respect to vehicle speed represented by said reference signal, said brake control means controlling application of the brake associated with said at least one wheel upon sensing spinning of said at least one wheel or of a tendency of said at least one wheel to spin; and a control connection (9) connecting the control unit (6) to the engine (2) and effecting a change in engine operation in a direction to decrease output torque being transmitted by the engine to the transmission (3) and hence to said differentials (3a, 4, 5) if the wheel speed signals derived from all the sensors (1a'-1d') indicate a speed of all the wheels representative of spinning of all the wheels.

2. Traction control system according to claim 1, wherein the control unit (6) compares
the wheel speed signals derived from said wheel speed sensors (1a'-1d') with a reference signal formed by the wheel speed signals from the wheel speed sensors associated with the wheels on one side of the vehicle.

3. Traction control system according to claim 1, wherein the control unit (6) compares the wheel speed signals derived from said wheel speed sensors (1a'-1d') with a reference signal having a level representative of the lowest spinning speed of any one wheel.

4. Traction control system according to claim 1, including maximum wheel speed signaling means connected to the control unit (6) and inhibiting application of braking control signals when a predetermined wheel speed is reached.

5. Traction control system according to claim 1, wherein said control unit includes a time delay connected between the speed sensors (1a'-1d') sensing actual vehicle speed and change in the reference signal value developed by said control unit (6).

* * * * *